Patented Nov. 11, 1952

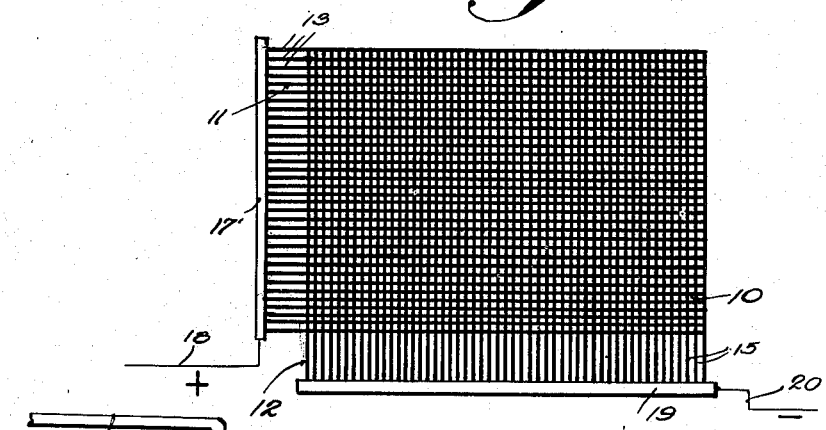
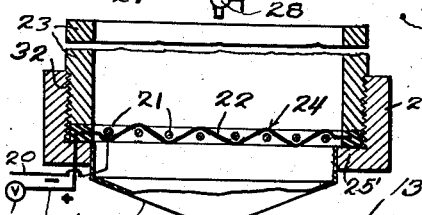
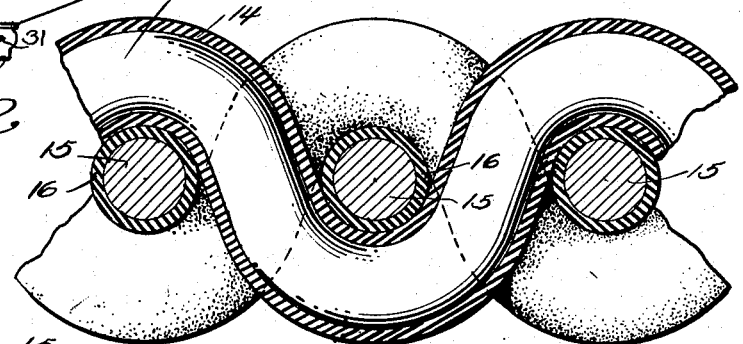
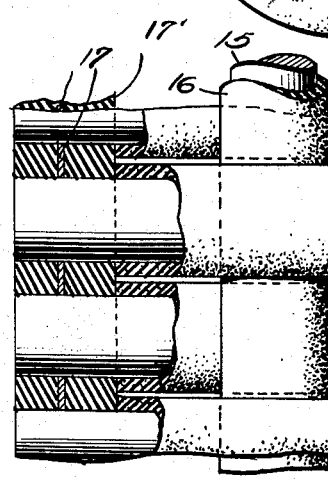

2,617,763

UNITED STATES PATENT OFFICE 2,617,763

APPARATUS FOR ELECTRICALLY FILTERING PARAFFINS

Karl A. Fischer, Washington, D. C.

Application April 8, 1949, Serial No. 86,373

3 Claims. (Cl. 204—299)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to an improved electrostatic filter and, more particularly, to improved electrostatic filters and their application to the separation of solids dispersed in liquids as, for example, paraffinic crystals in the dewaxing of oils or the like.

The filtration of solids from liquids in the presence of a filter medium assisted by an electrical field is known as such. However, the known processes operate efficiently in dewaxing oils or the like, only under high voltage well above a few thousand volts. A direct current is generally used to effect orientation of the particles and eventually conglomeration and neutralization of oppositely charged suspended particles to provide a "cake" upon the filter medium. Further, it has been generally presumed that heavy and dense filter media gave better results, relative to filtrate pour points. These dense filter mediums are detrimental to filtration velocity and, therefore, reduce plant capacity.

To overcome the use of dense filter media, filtration apparatus has been designed as illustrated in my copending application Serial No. 26,913, filed May 13, 1948, to operate as electric condensers in which the filter medium is a dielectric between or surrounded by oppositely charged conductors.

It has been discovered that contrary to the application of controlling porosity of the filter or of using specially designed dielectric filters of the condenser type, separation of solids from liquid dispersions can be effected with great ease by an electrostatic field generated by oppositely charged conductors acting as the filter medium.

It is, accordingly, an object of this invention to provide improved electrostatic filters.

It is another object of this invention to provide improved electrostatic filters utilizing as the filter media oppositely charged conductors which create a strong electric field at low voltages.

It is an additional object of this invention to provide improved method and apparatus for commercially filtering paraffinic crystals in the dewaxing of oils with the aid of an electrical field created by direct currents or in some cases, alternating current produced at low voltages on the order of 1000 and considerably less.

Other objects and advantages of this invention will be apparent from the following description when taken in conjunction with the accompanying drawings; wherein, Fig. 1 is an illustrated top plan view of a filter embodied in this invention;

Fig. 2 is an enlarged cross-sectional, partial end view of Fig. 1; and

Fig. 3 is an enlarged partial top plan view of my Fig. 1.

Fig. 4 is a filter pan and modified filter.

One form of the present invention, as illustrated herein, comprises filter media 10 formed of a pair of electrical conductors interwoven to produce a weave consisting of warp 11 and filling or shute 12. The warp 11, for example, is an electrical conductor 13, covered by an insulating body 14. The insulation 14 is a coating of an oil and solvent insoluble material in the nature of vinyl polymers, nylon, or the like. The filling 12, for example, is an electrical conductor 15, covered with electrical insulating material 16, of oil and solvent insoluble material as vinyl polymers, nylon, or the like.

As illustrated in Figures 1 and 3, the conductors 13 of the warp 11 are attached to a common electrical conductor 17 covered by insulation 17' illustratively charged by a direct current source, through a conventional voltage regulator (not shown), from the positive lead 18, and the conductor wires 15 of filling 12, are attached to the like common electrical conductor (not shown) covered by insulation 19 and adapted to be grounded or attached to the negative pole of a charging system through lead 20. The insulation 17' and 19 may be similar to the heretofore described insulation 14 and 16.

The above-described filter media may be installed in apparatus of the character illustrated in my copending application within conventional filters such as rotary or stationary pan, leaf or drum filters, to provide a smooth surfaced filter medium wherein strong electrical fields induced by low charges of only a few hundred volts or less are created at the point of filtration. With the warp and the filling weave as above indicated, in the form of a plain twill, Dutch or braid weave of a highly porous character, the relative porous area between the threads may be of comparatively greater size than the wax crystalline material or the like, which is to be separated. Ordinarily as may be expected when no charge is placed on the filter, incomplete and not fully satisfactory separation of solids and liquid takes place. However, when a charge of from 50 volts to only a few hundred volts is placed on the filter, a strong electric field is produced in the interstices of the weave due to the close proximity of the oppositely charged conductors. Further, filter units utilizing the field effect of oppositely charged conductors may be formed with conductors of the character herein indicated, insulated from each other and irregularly arranged as by intertwining, twisting or meshing to form a plurality of irregularly arranged interstices. In this arrangement, an electrical field of greater depth is obtained, although laminated layers of woven conductors will produce a like effect.

It is the usual practice in the oil dewaxing and wax producing plants to install a plurality of filters of the pan, leaf or drum type, in series or in parallel, according to the desired plant arrangement and capacity. As may be expected from the standpoint of efficiency, the operation of a wax filter plant is concerned with temperature, dilution, character of solvent, and rate of filtration. To produce wax cakes or oils having specific pour point characteristics, the first three factors can be determined and controlled with certainty, whereas the filtration rate, while a predominant factor in determining plant throughput and specific pour point values, is frequently variable and inaccurate. With the filter structure as herein provided, a control of current by maintenance of a predetermined voltage with a suitable voltage regulator provides means for influencing the percentage of wax separation which, in turn, automatically affects control of pour point values.

For example, wax crystals in propane-deasphaltized residual oils in a non-conductive dichlorethane solvent, chilled to −25° C. by a conventional method, are smaller in average size than the diameter of the openings in the weave formed by the electrical conductors 13 and 15. Obviously, the filter structure without an electrical charge will allow part of the crystals to pass through the filter. However, by placing a charge of only a dozen to a few hundred volts, the crystals are retained by the filter and the filtrate pour point is improved by 4° F. to 10° F. with the application of from approximately 50 to 500 volts. In some instances, only a few hundred volts and appreciably less than a thousand will produce an improved filtrate of better pour point value than standard filtration methods. Further, for some filtering operations the rate of filtration is increased by 10 percent to substantially more, due to the fact that wider mesh filter cloths can be taken.

While I have heretofore described in detail a specific construction, it is likewise possible, as diagrammatically illustrated in Fig. 4, to provide a filter structure which separates in a similar manner by utilizing in the weave a warp 21 consisting of an exposed metal surface which may be, for example, electrically conductive textile fibres or flexible metal strands and the like, with a shute or filling 22 consisting of a conductor core, of the character above described or covered by conventional insulating fibres, insulating plastic or enamels. For utilization of such filter media in the separation of paraffinic crystals or like solids, the conductor surface supporting medium of warp 21 and insulation coatings for filling 22 are of material insoluble in the filter stock.

Figure 4 also illustrates a filter structure for separating wax from oils and consisting of vertical shell 23 closed at its lower end by filter pad 24, constructed as indicated above or formed in any manner as herein described. This filter pad 24, being formed of conductors, is self-supporting when mounted by holding ring 25 on flanged portion 25'. The lead 18' feeds the insulated conductors 22 through a voltage regulator 26 and a common or unitary electrical connection of the character described with respect to Fig. 1. The ground 20 is likewise connected to the conductors 21. When a field in the filter pad 24 is energized by low voltages, the filter pan is ready to operate in a conventional manner or in a manner as described in the above-mentioned application. For example, a chilled solution is passed into the shell 23 from feed pipe 27 through control valve 28, crystalline and solid materials are deposited on filter pad 24 as the filtrate flows into receiving receptacle 29 from where it is discharged through outlet passageway 30 by control valve 31, as in conventional processes. The receptacle 29 may be integral with the holding ring 25 which is illustratively mounted by screw threads 32 or otherwise supported in the conventional manner for such filter units.

Likewise, while the filter media herein described have been illustrated for use with separation of paraffinic crystals, they are also applicable for use in the separation of aqueous suspensions or conductor liquid bodies when at least either the warp or filling has been insulated by a suitable insoluble insulator coating. Preferably in any direct current installation, it will be desirable to provide the positively charged conductor with insulation, inasmuch as the negative conductor may be grounded to the body of the container. Similarly, it is preferable, when alternating current is to be utilized with the filter media in the presence of aqueous or conductor liquids, to insulate both the warp and the filling in the manner as herein described.

With the above-described apparatus, it has been discovered that a control of pour point values can be made by control of applied voltages. Further, with the coatings provided either in the nature of a metallic or resinous material, a smooth contacting surface for the waxed cake is provided to afford complete separation of the filter cakes. In addition, it has been discovered that frequently, colloidal suspensions can be broken down under the condition of either A. C. or D. C. currents at low voltages on the order of from only a dozen or even less to a few hundred volts.

With the method and apparatus as herein disclosed, it will be obvious that an improved electrostatic filter utilizing properly insulated conductors as a filter medium may be used to produce an electrostatic field to advantage for the separation of solid material from liquids and that structural modifications may be made wherein oppositely charged conductors produce a filter medium which falls within the scope of the appended claims.

I claim:

1. An electrostatic filter comprising a woven fabric-like sheet material of insulated conductor warp threads and non-insulated conductor filling threads, said warp threads being attached to a common electrical pole and said filling threads being attached to a common electrical pole of opposite polarity, whereby the warp threads may be positively charged and the filling threads negatively charged.

2. An electrostatic filter comprising a first set of closely spaced parallel conductors, a second set of closely spaced parallel conductors substantially in the same plane as and crossed with said first set of conductors, at least one of said set of conductors being insulated, electrical attachment means for charging said first set of conductors positively, and electrical attachment means for charging said second set of conductors negatively.

3. An electrostatic filter cloth comprising an electrically conductive set of warp threads, an electrically conductive set of filler threads interwoven with said warp threads, at least one set of threads being insulated, electrical attachment means for charging one of said sets of threads positively, and electrical attachment means for charging the other of said sets of threads negatively.

KARL A. FISCHER.

REFERENCES CITED

The following references are of record in the file of this patent:

UNITED STATES PATENTS

| Number | Name | Date |
|---|---|---|
| 1,333,838 | Csanyi | Mar. 16, 1920 |
| 2,031,214 | Fisher | Feb. 18, 1936 |
| 2,107,770 | Wade | Feb. 8, 1938 |
| 2,292,608 | Buckman et al. | Aug. 11, 1942 |
| 2,450,016 | Pinkel | Sept. 28, 1948 |
| 2,478,934 | Morse | Aug. 16, 1949 |